United States Patent Office 3,558,679
Patented Jan. 26, 1971

3,558,679
PROCESS FOR THE EXTRACTION OF THE UN-SAPONIFIABLE FRACTION OF VEGETABLE OILS
Pierre Queval, Sainte-Genevieve-des-Bois, France, assignor to Laboratoires Laroche Navarron, Levallois, France, a French body corporate
No Drawing. Filed Feb. 16, 1968, Ser. No. 705,893
Claims priority, application Japan, Sept. 22, 1967, 42/60,569
Int. Cl. C11b 3/06
U.S. Cl. 260—425      4 Claims

ABSTRACT OF THE DISCLOSURE

The invention relates to a process for the extraction of the unsaponifiable fraction of vegetable oils by saponification followed by solvent extraction; this fraction, which is useful in human therapeutics, as additive for foods, etc., is prepared according to the invention, by submitting the vegetable oil itself, or the methyl esters of the fatty acids it contains to a dry saponification with lime, extracting in the cold with ethyl alcohol the mass from the saponification reaction and removing the alcohol from the alcohol extract to collect the desired unsaponifiable fraction.

---

The present invention relates to a process for the extraction of the unsaponifiable fraction (termed hereafter, for simplicity, "unsaponifiable") of vegetable oils. Such unsaponifiables are, on the whole, known products which are useful in various fields, particularly in human therapeutics as anti-inflammatory drugs, etc., as additives for foods, particularly for cattle, etc.

A process for the extraction of the unsaponifiables of vegetable oils, and particularly of corn oil, is already known, said process comprising submitting the oil to a saponification reaction with alcoholic potassium hydroxide and, after such reaction, collecting the fraction which is soluble in a water-immiscible solvent, which fraction constitutes the unsaponifiable.

This process has in particular the drawbacks of using an aggressive base (potassium hydroxide) which is capable of at least partly destroying the carotens, the tocopherols, and the like, present in the oil and to require the use of substantial amounts of solvents which are frequently dangerous or toxic, to effect the fiinal extraction.

The purpose of the present invention is to overcome the above drawbacks.

It has for its object a process for the extraction of the unsaponifiable fraction of vegetable oils by saponification followed by extraction by means of a solvent, comprising submitting the vegetable oil, or the methyl esters of the fatty acids it contains, to a dry saponification with lime, extracting in the cold with ethyl alcohol the mass resulting from the saponification reaction, and removing the alcohol from the alcohol extract to collect the desired unsaponifiable fraction.

Other characteristics of the invention will be apparent from an examination of the following disclosure.

According to the process of this invention, the vegetable oil (corn, palm, avocado, sunflower, etc. oil), or preferably the methyl esters of the fatty acids it contains are first submitted to a direct saponification, under dry conditions, by means of lime. Both quick-lime or slaked lime may be used, but it is preferred to use slaked lime. The reaction is carried out in the absence of any water supply, at a temperature of the order of 60–90° C., which may be varied according to the starting material used.

After several hours of stirring, a pasty mass which hardens on cooling is obtained.

This mass is ground, and is then extracted in the cold with ethyl alcohol. The titre of the latter is advantageously at least equal to 80%, to avoid too large a supply of water. Extraction is carried out by simple maceration in the cold. The insoluble calcium soaps formed during saponification are separated, for example by suction filtering of the alcohol extract.

The latter is then concentrated until the alcohol is completely removed, and a residue containing the entire unsaponifiable of the starting oil together with some residual calcium soaps is collected.

If desired, this residue may be used as such for some applications, for example as an additive for cattle foods.

When it is desired to obtain a pure unsaponifiable, for example for pharmaceutical use, the above product may be purified by dissolution in petroleum ether, in the presence of acetic acid which removes the calcium ions, then by washing the ethereal solution with a dilute aqueous solution of alkali metal hydroxide, of sodium hydroxide, for example, then with water, and then by evaporating the ethereal solution to dryness to give a purified unsaponifiable residue.

To obtain the methyl esters of fatty acids which constitute an advantageous starting material for the process according to the invention, the vegetable oil is reacted with methyl alcohol in the presence of refluxing sodium hydroxide. The reaction product is then neutralized with phosphoric acid; the product separates into two layers, the lower layer containing the disodium phosphate and glycerol formed, and the upper layer comprising primarily the methyl esters of fatty acids contained in the starting oil, said esters comprising the unsaponifiable fraction of the oil.

The use of the methyl esters as starting materials for the saponification with lime has the following advantages over the use of the oil itself:

(a) the reaction with lime is more rapid;
(b) said reaction occurs at a relatively low temperature of about 70° C.;
(c) the glycerol is readily recovered.

The process according to the invention has the following advantageous features over the known process:

(a) it permits use of ethyl alcohol, which is the less toxic solvent, as extraction solvent;
(b) lime is a base of low aggressivity, which respects carotens, tocopherols, and the like . . .;
(c) saponification under dry conditions gives directly a hard, dry, frangible soap which is readily ground by a mechanical procedure, thus avoiding tedious drying operations;
(d) the calcium soaps are poorly soluble in ethyl alcohol, and a residue with a very high unsaponifiable content is immediately obtained;
(e) extraction being carried out by maceration in the cold, the use of large amounts of alcohol for such operation is not required.

The non limiting examples below are given for the purpose of illustrating the invention.

EXAMPLE 1

(a) 4 litres of corn oil, 1.3 litres of methanol, 40 g. of sodium hydroxide, are refluxed during 1 hour.

After cooling, the reaction mixture is neutralized with 100 ml. of solution containing 50 g. of phosphoric acid; a demixing occurs: the lower layer contains the disodium phosphate and the glycerol; the upper layer comprises primarily the fatty acid methyl esters comprising the unsaponifiable.

(b) The methyl esters from step (a) (about 3 litres) are charged in a vessel provided with a powerful stirring device and powdered slaked lime is added thereto, in excess amount over the theory. The reaction mixture is heated at 80° C. on a water-bath, with stirring, during 2-3 hours; the methyl alcohol formed is distilled, the mass becomes pasty and then hardens on cooling.

The cooled mass is ground and is extracted with 10 litres of 95% ethyl alcohol. The insoluble calcium soaps are suction filtered and the extraction operation is repeated.

The resulting alcohol solution is then concentrated until the alcohol is entirely removed; a residue of about 80 g. containing the entire unsaponifiable and residual calcium soaps is thereby obtained.

The residue is solubilized in 500 ml. of petroleum ether, in the presence of 10% acetic acid (to remove the calcium ions), and the material is then washed with a 4% aqueous sodium hydroxide solution to remove the fatty acids released by the preceding acidic treatment.

The resulting material is then washed with distilled water and evaporated to dryness, to give the purified unsaponifiable.

EXAMPLE 2

To 4 litres of soybean oil previously heated at 80-90° C. are added, with stirring, about 700 g. of powdered slaked lime, while maintaining the temperature at the above level.

After heating for 8-10 hours, a firm pasty mass is obtained, which mass turns into a hard frangible mass on cooling.

The latter is ground mechanically and is suspended, with stirring, in 10 litres of 95% ethyl alcohol; the solution comprising the alcohol+glycerol+unsaponifiable+ a small amount of calcium soaps is then suction filtered.

The preceding extraction is repeated, and the resulting solutions are combined.

These are then evaporated to dryness, and purification is carried out according to the procedure of Example 1.

Having now described my invention what I claim as new and desire to secure by letters patent is:

1. Process for collecting the unsaponifiable fraction from the glycerides and the free acids in a vegetable oil, comprising:
   (a) adding to said oil at a temperature of 60-90° C. a sufficient amount of dry lime to saponify said glycerides into glycerine and calcium soaps and to convert said free acids into calcium soaps;
   (b) maintaining the mixture at said temperature during a time sufficient to obtain a paste comprising said unsaponifiable fraction, said calcium soaps and said glycerine;
   (c) cooling said paste until obtaining a mass;
   (d) grinding said mass and mixing it during a time and with an amount of ethyl alcohol sufficient to extract from said mass said unsaponifiable fraction in ethyl alcohol solution;
   (e) filtering said solution from said calcium soaps, and
   (f) evaporating said solution to dryness for collecting said unsaponifiable fraction.

2. Process for collecting the unsaponifiable fraction from the glycerides and the free acids in a vegetable oil, comprising:
   (a) refluxing said oil in the presence of sodium hydroxide with a sufficient amount of methyl alcohol to obtain a reaction mixture comprising the methyl esters of said free acids and glycerine;
   (b) cooling said reaction mixture and pouring phosphoric acid into said reaction mixture until obtaining a lower layer containing disodium phosphate and glycerine and an upper layer;
   (c) withdrawing said lower layer;
   (d) adding to said upper layer at a temperature of 60-90° C. a sufficient amount of dry lime to saponify said esters of free acids, and to convert said free acids into calcium soaps;
   (e) maintaining said temperature during a time sufficient to distil methyl alcohol which is formed and to obtain a paste comprising said unsaponifiable fraction and said calcium soaps;
   (f) cooling said paste until obtaining a hard mass;
   (g) grinding said mass and mixing it during a time and with an amonut of ethyl alcohol sufficient to extract from said mass said unsaponifiable fraction in ethyl alcohol solution,
   (h) filtering said solution from said calcium soaps and
   (i) evaporating said ethyl alcohol from said solution to collect said unsaponifiable fraction.

3. Process for collecting the unsaponifiable fraction from the gylcerides and the free acids in soybean oil, comprising:
   (a) adding to each 4 liters of said oil at least 700 grams of a member selected from the group consisting of slaked lime and quick lime at a temperature of 80-90° C.;
   (b) maintaining said temperature during 8-10 hours to obtain a paste;
   (c) cooling said paste until obtaining a hard mass;
   (d) grinding said mass and suspending it in at least 10 liters of ethyl alcohol for each 4 liters of said oil thus obtaining an ethyl alcohol solution containing said unsaponifiable fraction;
   (e) filtering said solution and
   (f) evaporating said solution to collect said unsaponifiable fraction.

4. Process for collecting the unsaponifiable fraction from the gylcerides and the free acids in corn oil comprising:
   (a) refluxing each 4 liters of said oil in presence of sodium hydroxide with 1.3 liter of methanol to obtain a reaction mixture comprising the methyl esters of said free acids and glycerine;
   (b) cooling said reaction mixture and pouring into said reaction mixture 50 grams of phosphoric acid for each 4 liters of said oil until obtaining a lower layer containing disodium phosphate and glycerine and an upper layer, withdrawing said lower layer;
   (c) adding to said upper layer at a temperature of 60-90° C. a member selected from the group consisting of slaked lime and quick lime in an amount in excess over the theoretical amount required to saponify said esters of free acids and to convert said free acids into calcium soaps;
   (d) maintaining the mixture at this temperature during 2-3 hours to obtain a paste;
   (e) cooling said paste until obtaining a hard mass;
   (f) grinding said mass and suspending it in at least 10 liters of ethyl alcohol for each 4 liters of said oil thus obtaining an ethyl alcohol solution containing said unsaponifiable fraction;
   (g) filtering said solution from said mass, and
   (h) evaporating said ethyl alcohol to collect said unsaponifiable fraction.

References Cited

UNITED STATES PATENTS 2,653,957  9/1953  Westergaard _____ 260—412.4

FOREIGN PATENTS 144,176  6/1920  Great Britain _____ 260—425

LEWIS GOTTS, Primary Examiner

E. G. LOVE, Assistant Examiner

U.S. Cl. X.R.

260—410.9